United States Patent Office 2,972,906
Patented Feb. 28, 1961

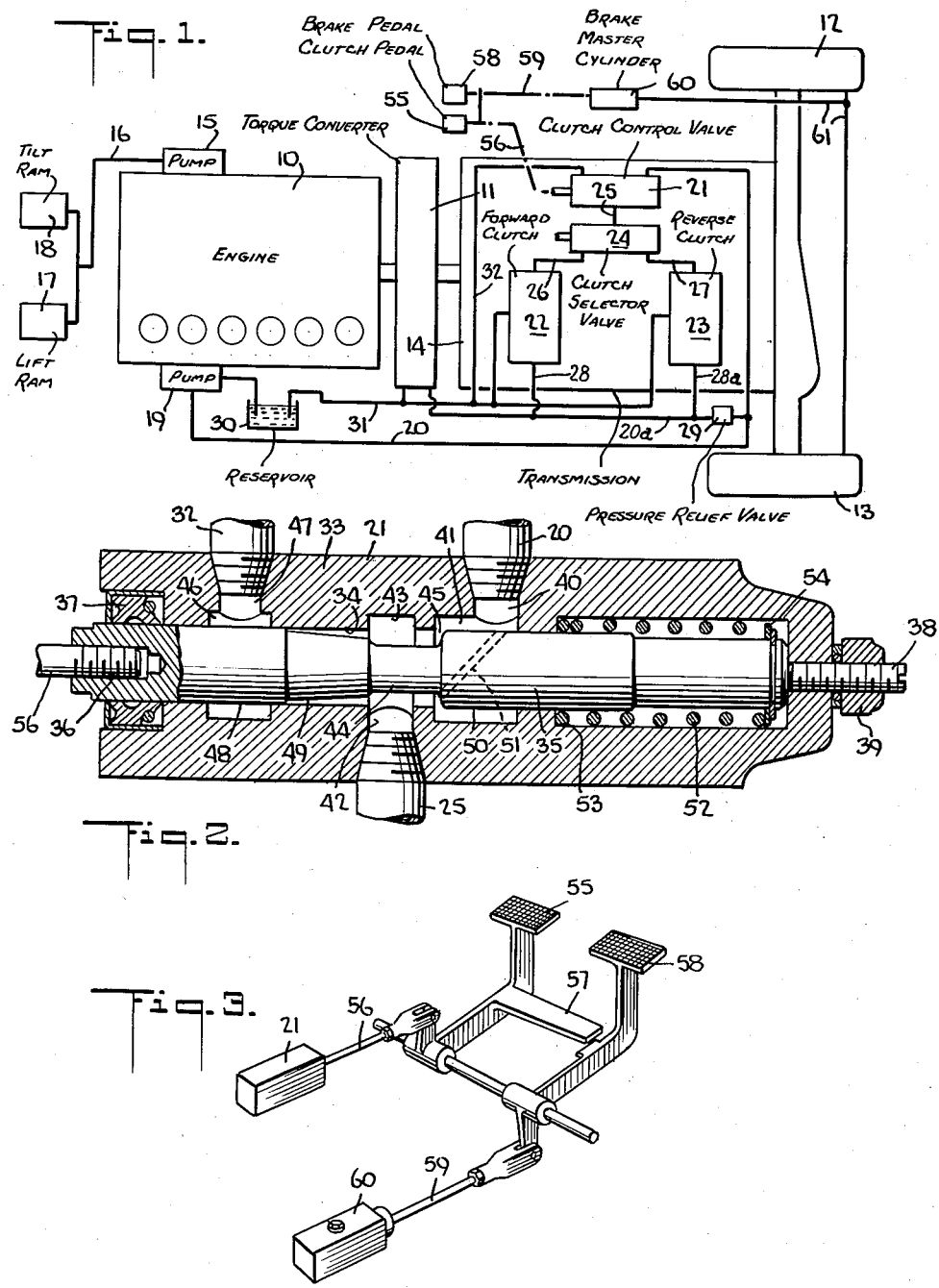

2,972,906

INCHING CONTROL FOR INDUSTRIAL TRUCK

Charles S. Schroeder, Villanova, Pa., assignor to The Yale and Towne Manufacturing Company, Stamford, Conn., a corporation of Connecticut Filed Sept. 21, 1959, Ser. No. 841,195

6 Claims. (Cl. 74—732)

This invention relates to industrial trucks and more particularly to a control system for controlling the hydraulically actuated forward and reverse clutches which serve to connect the transmissions with the engine driven torque converters of such trucks.

In trucks of this type, the engine also serves to drive a pump which supplies fluid under pressure to the tilting and lifting rams to tilt, lift and otherwise manipulate a load.

In utilizing such a truck, it is often found necessary to tilt or lift at a high speed while slowly inching the truck forwardly or rearwardly. This means that the engine of the truck must be operated at high speed in order to obtain the rapid tilting or lifting while the truck is inched along at a very slow speed. To provide for this slow inching movement of the truck while the motor is being operated at a high speed, it has heretofore been proposed to provide a spool valve in the hydraulic circuit to the hydraulically operated clutches for varying the hydraulic pressure on the clutches to allow controlled slippage of the clutches. Variation in pressure on the clutches was provided by moving the spool of the spool valve to gradually cover an input port and gradually uncover a relief port.

It has been found that in such control systems as heretofore proposed, relatively large volumes of fluid passed through the spool valve when the spool was in a medial position as both the input and relief ports were open a substantial amount in this position of the spool. This meant that very little or no fluid was available for the torque converter and for lubrication and cooling of the clutches and other elements of the truck which are supplied with fluid from the same pump that supplies fluid to the clutches. This was due to the fact that in order for the fluid to flow to the torque converter and to the lubricating and cooling circuits a spring pressed pressure relief valve had to be opened, and the by-passing of a large volume of the fluid through the spool valve prevented a build up of sufficient pressure in the system to actuate the pressure relief valve. In order to avoid this, it has been suggested that the input port of the spool valve be restricted to decrease the volume of flow to the clutches to thereby insure sufficient pressure to actuate the pressure relief valve so as to provide sufficient flow of fluid to the torque converter and to the lubricating and cooling circuits during inching of the truck. This, however, results in an insufficient flow of fluid to provide rapid actuation of the clutches during normal operation of the truck.

It has also been found that in control systems as heretofore proposed in which an input port was gradually closed and a relief port gradually opened, uncontrolled variations in the pressure on the clutches often occurred without corresponding actuation of the spool valve. This resulted in the truck moving or stopping unexpectedly during inching movement without warning to the operator. Apparently these pressure variations were due to radical changes in the pressure drops across the restricted ports of the spool valve as the velocity of the fluid flowing there through changed with changes in speed of the engine.

The present invention provides a control system which will insure sufficient pressure and flow of fluid to the torque converter and the lubricating and cooling circuit during inching of the truck, while at the same time providing a sufficient flow of fluid to rapidly actuate the clutches when that is desired. The invention also provides a control system which minimizes uncontrolled variations in pressure on the clutches so that the operator has much better control over the inching movement of the truck.

In accordance with the present invention, two input passageways are provided for admitting fluid under pressure to the clutches. One passageway is of relatively high volumetric capacity and is used to rapidly actuate the clutches. This passageway of high volumetric capacity is open only when a relief passageway adapted to relieve pressure on the clutches is closed. Thus, when the passageway of high volumetric capacity is open to actuate the clutches or to hold the clutches actuated, there is no loss of fluid or pressure in the system through the relief passageway, thereby insuring the effective unseating of the pressure relief valve and sufficient flow and pressure to the torque converter and the lubricating and cooling circuits at this time. The other input passageway is of relatively low volumetric capacity and is used to admit a small flow of fluid which may be varied by gradual opening and closing of the relief passageway to vary the pressure on the clutches so as to permit slipping of the clutches and inching of the truck. As the maximum volume of fluid that can pass through the passageway of low volumetric capacity is relatively small, the drop in pressure on the pressure relief valve is negligible, thereby insuring effective unseating of the pressure relief valve and sufficient pressure and flow to the torque converter and the lubricating and cooling circuits during inching of the truck.

The invention having been broadly described, a more detailed description of one embodiment of the invention is given hereafter by reference to the accompanying drawings wherein:

Fig. 1 is a diagrammatic showing of the driving and braking system of a truck incorporating the novel control system of the present invention;

Fig. 2 is a sectional view of the clutch control valve incorporating the novel arrangement of input and relief passageways of the present invention, and Fig. 3 is a diagrammatic showing of a clutch and brake pedal arrangement that may be used to actuate the clutch control valve shown in Fig. 2.

Referring to the drawings, and in particular to Fig. 1, the internal combustion engine of the truck is indicated by the reference numeral 10. Engine 10 serves to drive a torque converter 11 which in turn drives wheels 12 and 13 through a transmission 14. The engine 10 also serves to drive a pump 15 which supplies fluid pressure through a hydraulic line 16 for operating the usual load manipulating devices, such as a lift ram 17 and a tilt ram 18.

A pump 19, also driven by the engine 10, serves to supply fluid under pressure through a hydraulic line 20 to a clutch control valve 21. As will be described in detail hereafter, the valve 21 incorporates the novel arrangement of input and relief passageways of the present invention, and serves to vary the clutch pressure on either a forward clutch 22 or a reverse clutch 23. Clutches 22 and 23 are of the conventional hydraulically actuated type which are engaged by the application of hydraulic pressure thereto and become disengaged by spring pressure when the hydraulic pressure is released.

Fluid under pressure is admitted to either forward clutch 22 or reverse clutch 23 by means of a conventional directional or selector valve 24 which is connetced to the control valve 21 by a hydraulic line 25 and is connected to the clutches 22 and 23 by hydraulic lines 26 and 27, respectively. As is well known to those skilled in the art, selector valve 24 may be selectively actuated to admit fluid pressure from valve 21 to the forward clutch 22 to drive the truck in a forward direction, or to admit fluid pressure to the reverse clutch 23 to drive the truck in a reverse direction. The selector valve 24 can also be set in a neutral position in which fluid under pressure is not admitted to either clutch 22 or 23, so that neither clutch is in driving engagement.

Fluid under pressure is also supplied from hydraulic line 20 through a hydraulic line 20a to the torque converter 11 and to lubricating lines 28 and 28a to the clutches 22 and 23 by unseating a conventional spring pressed, pressure relief valve 29. The pressure relief valve 29 is set to open only when there is sufficient pressure on line 20 to properly operate the clutches 22 and 23. Fluid from the torque converter 11, and lubricating fluid from the clutches 22 and 23 is returned to a reservoir or sump 30 through a return line 31. Fluid from the clutch control valve 21 is returned through a hydraulic line 32 and hydraulic line 31 to the reservoir 30.

As best shown in Fig. 2, the clutch control valve 21 includes a valve body 33 having a bore 34 in which is slidably received a plunger or spool 35. The bore 34 is open at one end and one end of the spool 35 extends through the opening and is threaded as indicated at 36 so that it may be connected to a suitable actuating mechanism. A suitable oil seal 37 is carried in a recess in the end of the valve body and surrounds the end of the spool 35 to prevent leakage of fluid from the valve while allowing axial movement of the spool 35. A stud 38 threaded through the opposite end of the bore 34 serves as an adjustable stop for adjusting the extent of inward movement of the spool 35. A nut 39 serves to lock the stud 38 in adjusted position.

Fluid under pressure from the hydraulic line 20 enters the valve 21 through an opening 40 which communicates with an annular chamber 41 formed in the inner surface of the bore 34. Line 25 which connects valve 20 with the selector valve 24 is attached to an opening 42 through the valve body 33. Opening 42 communicates with a central annular chamber 43 formed in the inner surface of the bore 34. The spool 35 is provided with an intermediate portion 44 of reduced diameter and when the spool 35 is in the position shown in Fig. 2, chamber 41 is in direct communication with annular chamber 43 through an annular passageway of relatively large volumetric capacity formed between the reduced portion 44 of the spool 35 and the bore 34 as indicated at 45. Thus when the spool 35 is in the position shown in Fig. 2, a large volume of fluid may pass from line 20 through the valve 21 and out of line 25 to rapidly actuate either clutch 22 or 23, depending on the setting of the selector valve 24.

The valve 20 is also provided with a relief passageway formed by an annular chamber 46 which communicates with an opening 47 through the wall of the valve body 33. Return line 32 is connected to the opening 47 so that fluid may be returned to the reservoir 30. When, however, spool 35 is in the position shown in Fig. 2, the annular chamber 46 is closed by a cylindrical surface 48 on the spool 35 so that no fluid may pass from the annular chamber 43 through the relief passageway formed by the annular chamber 46 and opening 47. Thus, when the input passageway 45 of high volumetric capacity is open, as shown in Fig. 2, to actuate either clutch 22 or 23 or to hold either clutch 22 or 23 actuated, there is no loss of pressure or fluid in the line 20, thereby insuring sufficient pressure to unseat the relief valve 29 (Fig. 1) and sufficient pressure and flow of fluid through line 26 to the torque converter 11 and lubricating lines 27 and 28 to the clutches 22 and 23.

When, however, the spool 35 is shifted to the left, the relief passageway formed by annular chamber 46 and opening 47 is gradually opened, by reason of the provision of a tapered portion 49 on the spool 35, to relieve pressure on either clutch 22 or 23. However, as can be seen from Fig. 2, this does not occur until the annular input passageway 45 of high volumetric capacity is closed by a cylindrical surface 50 on the spool 35, so that fluid from the line 20 is restricted to flow only through an input passageway 51 of relatively small volumetric capacity which is formed through the spool 35 from the cylindrical surface 50 to a shoulder surface formed by the reduced portion 44 of the spool 35. Thus when the relief passageway formed by the annular chamber 46 and opening 47 is opened by movement of the spool 35 to the left to reduce the pressure on either the clutch 22 or 23 so as to provide slippage and therefore inching of the truck, only a small volume of fluid may pass through the passageway 51. Accordingly, at most there is only a small, practically negligible, drop in pressure in the line 20 thereby insuring sufficient pressure in the line 20 to unseat the pressure relief valve 29 and sufficient pressure and flow to the torque converter 11 and the lubricating lines 27 and 28. At the same time the passageway 51 provides for a sufficient flow so that the pressure on either clutch 22 or 23 may be readily and accurately controlled by varying the flow of fluid through the passageway 51 by moving the spool 35 to gradually open or close the relief passageway formed by the annular chamber 46 and opening 47. Thus, the slippage on either clutch 22 or 23 can be accurately controlled to provide the desired inching movement of the truck.

The spool 35 is normally urged to the position shown in Fig. 2 by a compression spring 52 which surrounds one end of the spool 35 and is interposed between a shoulder 53 formed in the bore 34 and a collar 54 secured to the spool 35. Any suitable mechanism may be used to move the spool 35 to the left as viewed in Fig. 2 against the pressure of spring 52 to provide controlled slippage of either clutch 22 or 23. A mechanical linkage and foot treadle arrangement such as shown in Fig. 3, which is of the type generally described in my U.S. Patent No. 2,883,015, is particularly well suited for moving the spool 35, as such an arrangement permits substantial foot treadle travel for small movement of the spool. This gives the operator better control over slippage of the clutches and therefore inching of the truck. The arrangement as shown in Fig. 3 includes a clutch treadle 55 which moves the spool 35 through a suitable linkage 56 to vary the pressure on either clutch 22 or 23, depending on which clutch is in driving engagement. An arm 57 secured to clutch treadle 55 engages and serves to depress a brake treadle 58 which is connected through a linkage 59 to a brake master cylinder 60. When brake treadle 58 is depressed, the master cylinder 60 applies fluid pressure to brake lines 61 to apply the brakes. Preferably, some free travel of the clutch treadle 55 is provided before it actuates the brake treadle 58 so that some slippage of either clutch 22 or 23 may be obtained before the brakes are applied. This prevents excessive wear of the brakes during normal inching movement, but allows the brakes to be quickly applied by depressing the clutch treadle 55 in the event an emergency should arise during inching requiring quick stopping of the truck. The brake treadle 58 can, of course, be independently operated if such is desired.

From the preceding description it can be seen that there is provided a novel control system which insures sufficient pressure and flow of fluid to the torque converter and the lubricating circuits of an industrial truck during inching movement of the truck, while at the same time providing sufficient flow of fluid to rapidly actuate the forward or reverse clutch when such is desired.

While an embodiment of the invention has been shown and described, it will be appreciated that this is for the purpose of illustration and that changes and modifications may be made therein without departing from the spirit and scope of the invention.

I now claim:

1. In an industrial truck, a source of fluid under pressure, a fluid actuated clutch for controlling movement of the truck, means having first passageway means of relatively high volumetric capacity connecting said source of fluid under pressure to said clutch to supply a high volume of fluid to actuate said clutch quickly, means having second passageway means of relatively low volumetric capacity connecting said source of fluid under pressure to said clutch, means having relief passageway means for relieving fluid pressure on said clutch to permit slippage of the clutch, means for gradually opening and closing said relief passageway means to vary the pressure on said clutch, and means operatively connected to said last named means for closing said first passageway means before said relief passageway means are opened whereby fluid from said source of fluid under pressure is restricted to flow only through said second passageway means when said relief passageway means is opened.

2. In an industrial truck, a source of fluid under pressure, a fluid actuated clutch for controlling movement of said truck, valve means for connecting said source of fluid under pressure to said clutch, said valve means having an internal chamber, said valve means having a first input passageway of relatively high volumetric capacity connected with said source of fluid under pressure and communicating with said chamber, said valve means having a second input passageway of relatively low volumetric capacity connected with said source of fluid under pressure and communicating with said chamber, said valve means having an outlet passageway connected to said clutch and communicating with said chamber, said valve means having a relief passageway adapted to communicate with said chamber, a plunger movable in said chamber, a surface on said plunger for gradually opening and closing said relief passageway upon movement of said plunger, and a surface on said plunger for closing said first input passageway before said relief passageway is opened so that flow of fluid from said source of fluid under pressure is restricted to flow through said second input passageway when said relief passageway is open.

3. In an industrial truck, a source of fluid under pressure, a fluid-actuated clutch for controlling movement of said truck, valve means for connecting said source of fluid under pressure to said clutch, said valve means having an internal chamber, an input passageway of relatively high volumetric capacity connected to said source of fluid under pressure and communicating with said chamber, an outlet passageway of relatively high volumetric capacity connected to said clutch and communicating with said chamber whereby a high volume of fluid may pass from said input passageway to said clutch to actuate said clutch rapidly, a relief passageway communicating with said chamber, a plunger movable in said chamber, said plunger having a surface thereon for gradually closing and opening said relief passageway upon movement of said plunger and having a surface thereon for closing said input passageway before said relief passageway is opened, and a second input passageway of relatively low volumetric capacity extending through said plunger and communicating with said chamber and said source of fluid under pressure when said relief passageway is open and said passageway of high volumetric capacity is closed.

4. In an industrial truck having a hydraulic torque converter, an engine for driving said torque converter, a transmission including a hydraulically actuated clutch for connecting said transmission to said torque converter to drive said truck, a fluid pump driven by said engine, means including a pressure relief valve for admitting fluid from said pump to said torque converter when said fluid is at a predetermined pressure, means including a control valve for admitting fluid pressure from said pump to said clutch in the operation of said clutch, said control valve including an input passageway of relatively high volumetric capacity for admitting a high volume of fluid to said clutch for quickly actuating and holding said clutch actuated, a relief passageway for relieving pressure on said clutch to permit slippage of the clutch, and an input passageway of relatively low capacity for admitting fluid pressure to said clutch when said relief passageway is open, means for gradually opening and closing said relief passageway to vary the pressure on said clutch, and means operatively connected to said last-named means to close said passageway of relatively high volumetric capacity before said relief passageway is opened whereby fluid from said source of fluid under pressure is restricted to flow only through said passageway of relatively low volumetric capacity when said relief passageway is opened whereby sufficient pressure is maintained to actuate said relief valve to supply fluid to said torque converter.

5. In an industrial truck having a hydraulic torque converter, an engine for driving said torque converter, a transmission including a hydraulically actuated clutch for connecting said transmission to said torque converter to drive said truck, a fluid pump driven by said engine, means including a pressure relief valve for admitting fluid from said pump to said torque converter and to said clutch to lubricate and cool said clutch when said fluid is at a predetermined pressure, means including a control valve for admitting fluid pressure from said pump to said clutch to operate said clutch, said control valve including an input passageway of relatively high volumetric capacity for admitting a high volume of fluid to said clutch for quickly actuating and holding said clutch actuated, a relief passageway for relieving pressure on said clutch to permit slippage of the clutch, and an input passageway of relatively low capacity for admitting fluid pressure to said clutch when said relief passageway is open, means for gradually opening and closing said relief passageway to vary the pressure on said clutch, and means operatively connected to said last-named means to close said passageway of relatively high volumetric capacity before said relief passageway is opened whereby fluid from said source of fluid under pressure is restricted to flow only through said passageway of relatively low volumetric capacity when said relief passageway is opened whereby sufficient pressure is maintained to actuate said relief valve to supply fluid to said torque converter.

6. In an industrial truck, a source of fluid under pressure, a fluid actuated clutch for controlling movement of the truck, means having first passageway means of relatively high volumetric capacity connecting said source of fluid under pressure to said clutch whereby to actuate said clutch quickly, means having second passageway means of relatively low volumetric capacity connecting said clutch to said source of fluid pressure, means having relief passageway means for relieving fluid pressure on said clutch to permit slippage of the clutch, and control means for closing said relief passageway means when said clutch is connected to said source of fluid pressure through said high volumetric passageway means and for opening said relief passageway means when said fluid operated clutch is connected to said fluid pressure source only through said relatively low volumetric passageway means.

References Cited in the file of this patent

UNITED STATES PATENTS

| | | |
|---|---|---|
| 1,979,488 | Perez | Nov. 6, 1934 |
| 2,692,511 | Nallinger | Oct. 26, 1954 |
| 2,765,893 | Stuart | Oct. 9, 1956 |
| 2,815,684 | Roche | Dec. 10, 1957 |
| 2,907,232 | Duffy | Oct. 6, 1959 |